(12) United States Patent
Barnett et al.

(10) Patent No.: US 8,502,470 B2
(45) Date of Patent: Aug. 6, 2013

(54) DC DISTRIBUTION SYSTEM

(75) Inventors: Thomas Alan Barnett, Ypsilanti, MI (US); Jeffrey Iott, Monroe, MI (US); Jian Xu, Windsor (CA)

(73) Assignee: Enocean GmbH, Oberhaching (DE)

( * ) Notice: Subject to any disclaimer, the term of this patent is extended or adjusted under 35 U.S.C. 154(b) by 828 days.

(21) Appl. No.: 12/417,800

(22) Filed: Apr. 3, 2009

(65) Prior Publication Data

US 2009/0251072 A1  Oct. 8, 2009

Related U.S. Application Data

(60) Provisional application No. 61/042,449, filed on Apr. 4, 2008.

(51) Int. Cl.
*H05B 37/02* (2006.01)
*H02J 1/00* (2006.01)
*H02J 1/04* (2006.01)

(52) U.S. Cl.
USPC ............................. 315/297; 315/313; 307/38

(58) Field of Classification Search
None
See application file for complete search history.

(56) References Cited

U.S. PATENT DOCUMENTS

| | | | |
|---|---|---|---|
| 5,043,531 A | 8/1991 | Gutenson et al. | |
| 6,160,728 A | 12/2000 | Peterson et al. | |
| 6,608,453 B2 | 8/2003 | Morgan et al. | |
| 6,744,223 B2 | 6/2004 | Laflamme et al. | |
| 6,778,078 B1 | 8/2004 | Han et al. | |
| 7,038,399 B2 | 5/2006 | Lys et al. | |
| 7,348,736 B2 | 3/2008 | Piepgras et al. | |
| 7,474,016 B2 * | 1/2009 | Wang et al. | 307/45 |
| 7,719,130 B2 * | 5/2010 | Hirose et al. | 307/1 |
| 7,911,079 B2 * | 3/2011 | Hoff et al. | 307/10.1 |
| 2004/0124741 A1 * | 7/2004 | Morrison et al. | 310/314 |
| 2005/0207159 A1 | 9/2005 | Maxik | |
| 2007/0091598 A1 | 4/2007 | Chen | |

FOREIGN PATENT DOCUMENTS

JP    2007-124864    5/2007

OTHER PUBLICATIONS

"Wireless Sensor Solutions for Home & Building Automation—The Successful Standard Uses Energy Harvesting" Graham Martin, Aug. 10, 2007. URL: http://www.enocean.com/fileadmin.redaktion/pdf/white_paper/wp_wireless_sensor_solutions.pdf.
"Bus Terminal I/O Design and Implementation Notes" BECKOff Application Notes, Nov. 2, 2007. URL: ftp://209.240.67.25/Application%20Notes/web/Manual-001/pdf/Manual-001.pdf.
"Light Show or Light Reality?", PC Control, No. 3, Oct. 2007, XP002531949. URL: http://www.pc-control.org/pdf/032007/p.
"Distributed Generation from Renewable Sources in an Isolated DC Network" AZBE v et al., Renewable Energy, Pergamon Press, Oxford, GB, vol. 31, No. 14, Nov. 1, 2006.
International Search Report and Written Opinion dated Jul. 21, 2009.
International Preliminary Report on Patentability mailed Jul. 29, 2010.

* cited by examiner

*Primary Examiner* — Crystal L Hammond
(74) *Attorney, Agent, or Firm* — Foley & Lardner LLP; Matthew L. Fenselau

(57) ABSTRACT

A direct current power system according to one non-limiting embodiment includes a direct current power source operable to distribute a direct current voltage throughout at least one structure, and at least one controller operable to selectively couple a direct current load to the direct current voltage in response to a wireless signal from an energy-harvesting switch.

16 Claims, 4 Drawing Sheets

US 8,502,470 B2

DC DISTRIBUTION SYSTEM

The application claims priority to U.S. Provisional Application No. 61/042,449 which was filed on Apr. 4, 2008.

BACKGROUND OF THE INVENTION

This application relates to power distribution systems, and more particularly to a direct current ("DC") distribution system.

Electrical systems for buildings, such as residential buildings, are designed for alternating current ("AC") and AC loads. Some loads, however, such as light-emitting diodes ("LEDs"), may require DC to operate. Existing LED lighting solutions have incorporated a substantial amount of electronics in a LED lamp to convert AC to DC to power the LED lamp. Other DC loads require AC adapters plugged into electrical outlets that perform an AC to DC conversion.

SUMMARY OF THE INVENTION

A DC power system according to one non-limiting embodiment includes a DC power source operable to distribute a DC voltage throughout at least one environment, and at least one controller operable to selectively couple a DC load to the DC voltage in response to a wireless signal from an energy-harvesting switch.

A DC lighting system according to one non-limiting embodiment includes a DC power source operable to distribute a DC voltage throughout at least one environment, and at least one controller operable to selectively couple a DC lighting source to the DC voltage in response to a control signal.

A method for controlling electrical power in an environment includes converting an AC voltage to a first DC voltage, distributing the DC voltage in an environment, converting the first DC voltage to a second DC voltage, and selectively coupling a DC load to the second DC voltage in response to a control signal.

These and other features of the present invention can be best understood from the following specification and drawings, the following of which is a brief description.

DETAILED DESCRIPTION OF THE EMBODIMENTS

Figure 1:
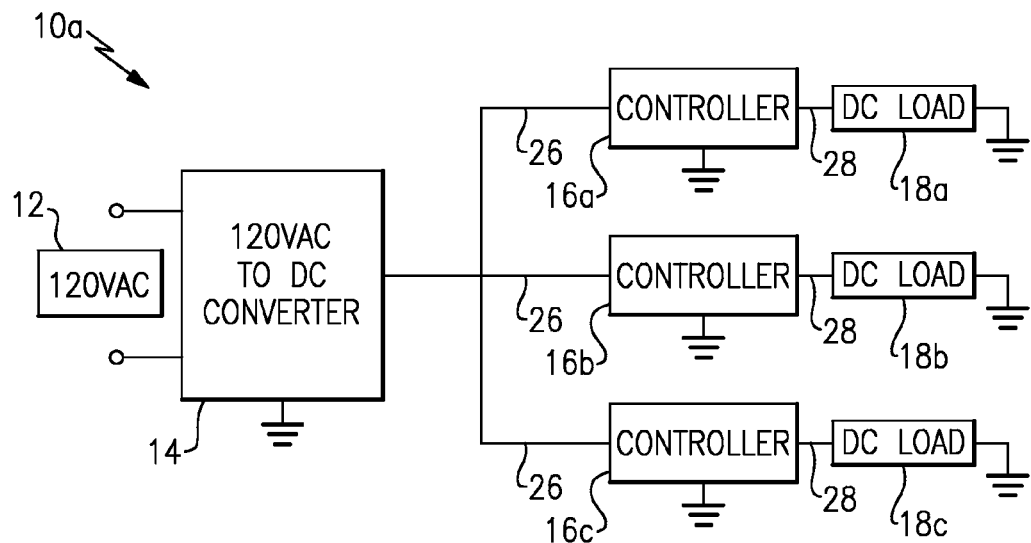
FIG. 1 schematically illustrates a first low voltage DC distribution system.

FIGS. 1-5 schematically illustrate a plurality of DC distribution systems 10a-e. FIG. 1 schematically illustrates a first DC distribution system 10a that includes an AC power source 12 and a power converter 14 coupled to the AC power source 12. The power converter 14 is operable to convert an AC input voltage from the AC power source 12 to a DC voltage.

Throughout this application an example AC input voltage of 120 VAC is illustrated. However, it is understood that other AC input voltages could be used. For example, 220 VAC is commonly used in Europe, and could be used with any of the disclosed systems 10a-e. The power converter 14 supplies power throughout at least one structure (see, e.g. FIG. 7) via a plurality of power lines 26 to a plurality of controllers 16a-c.

Each controller 16 is coupled to at least one DC load 18 via power lines 28. In one example the DC loads 18 include lighting loads (e.g. luminaires having LEDs). Of course, other DC lighting loads, and other DC non-lighting loads could be used. Also, although FIG. 1 illustrates a single load 18 coupled to each controller 16, it is understood that the controller 16 could be a multi-channel controller, and that other quantities of loads 18 could be coupled to each controller 16 (see, e.g., FIGS. 6a-b). In one example each of the controllers 16a-c are operable to receive wireless signal commands from an energy-harvesting switch 32 (see FIGS. 6a-b).

Figure 2:
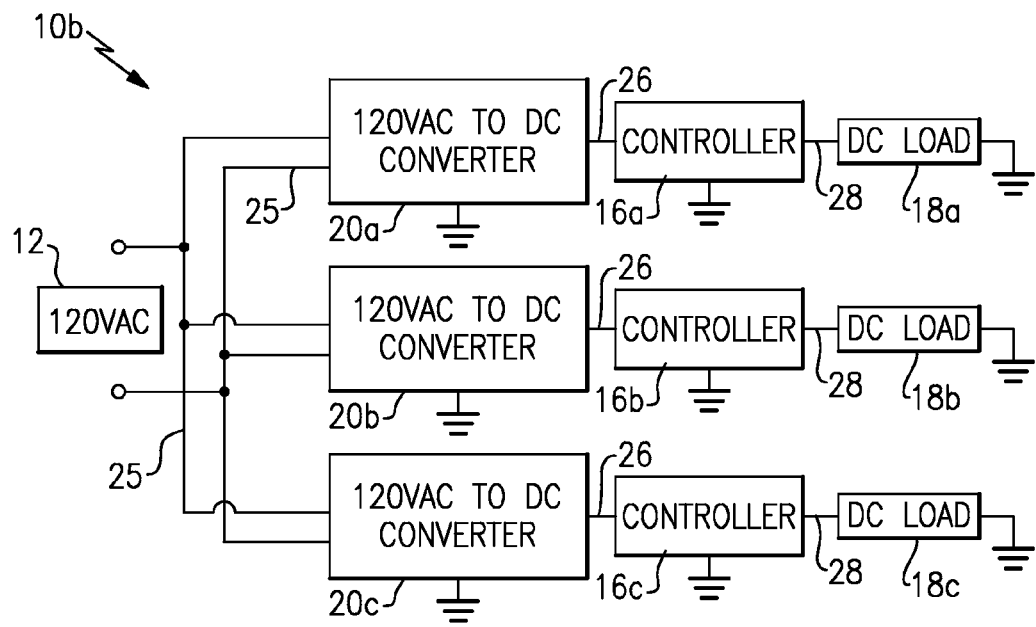
FIG. 2 schematically illustrates a second DC distribution system.

FIG. 2 schematically illustrates a second DC distribution system 10b. Instead of a single power converter 14 as in the system 10a of FIG. 1, the system 10b includes a plurality of power converters 20a-c. In the context of a structure (e.g. a building), AC voltage may be distributed along power lines 25. The plurality of power converters 20a-c are operable to convert the AC voltage to a DC voltage, and to distribute the DC voltage along power lines 26 to the controllers 16. The controllers 16a-c are operable to distribute the DC voltage via power lines 28 to loads 18a-c.

Figure 3:
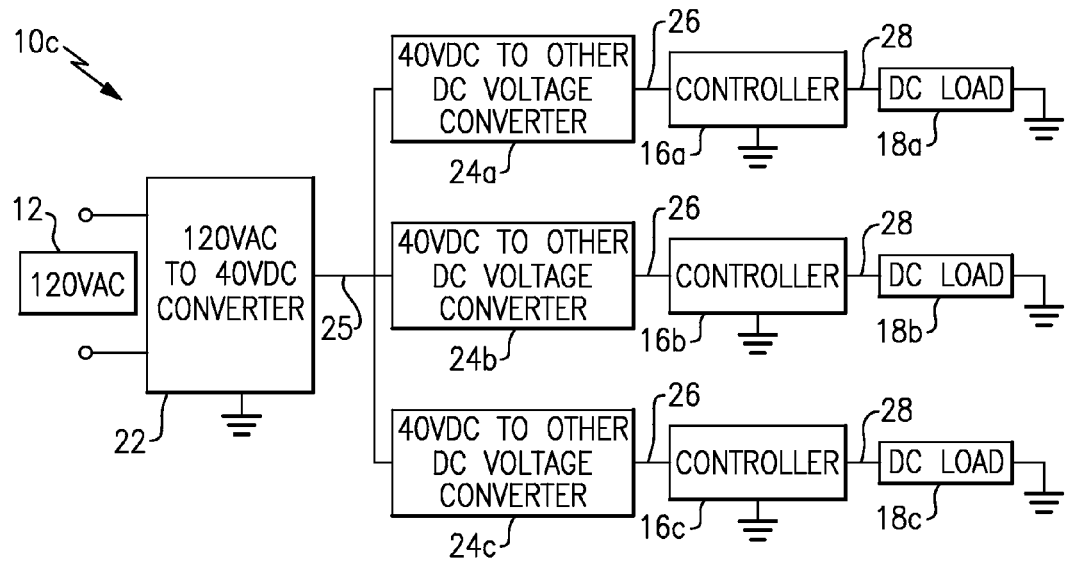
FIG. 3 schematically illustrates a third DC distribution system.

FIG. 3 schematically illustrates a third DC distribution system 10c that includes a first power converter 22 and a plurality of second power converters 24a-c coupled to the first power converter 22. The first power converter 22 is operable to convert an AC input voltage from the AC power source 12 into a first DC voltage, which is distributed along power lines 25. Although FIG. 3 illustrates the first DC voltage as being 40 VDC, it is understood that other DC voltages could be used. The plurality of second power converters 24a-c are operable to convert the first DC voltage to a second DC voltage that is higher or lower than the first DC voltage. The second DC voltage is distributed along power lines 26 to controllers 16a-c. The controllers 16a-c are operable to distribute the second DC voltage along power lines 28 to loads 18a-c.

Figure 4:
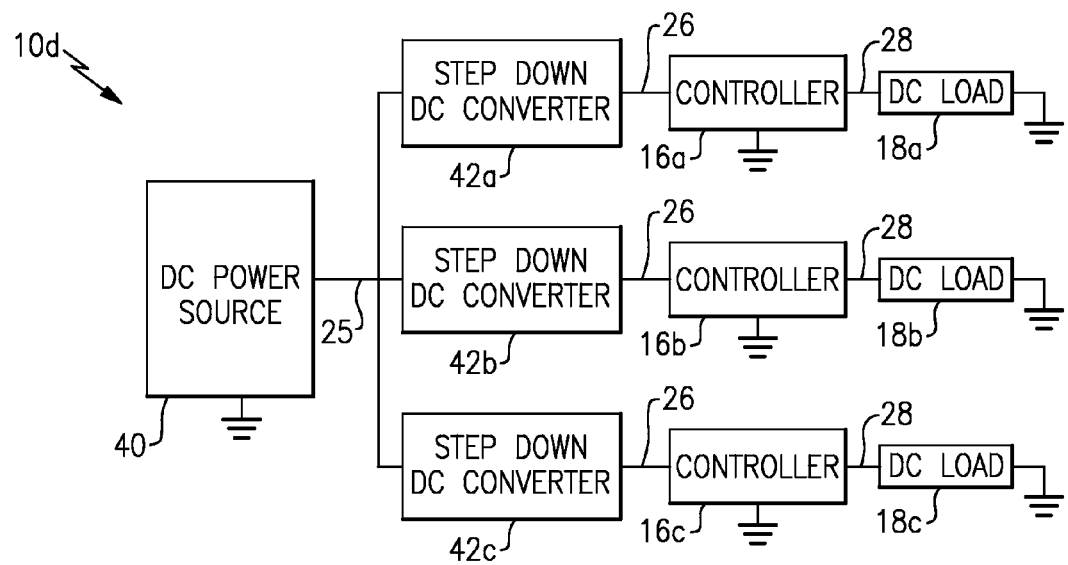
FIG. 4 schematically illustrates a fourth DC distribution system.

FIG. 4 schematically illustrates a fourth DC distribution system 10d that includes a DC power source 40, operable to distribute a first DC voltage along power lines 25. The DC power source 40 may include, for example, a solar power source, a battery stack or plurality of battery stacks, or an electric generator. A plurality of step down DC converters 42a-c are operable to convert the first DC voltage from the DC power source 40 to a second DC voltage that is lower than the first DC voltage, for distribution along power lines 26. The controllers 16a-c are operable to distribute the second DC voltage along power lines 28 to loads 18a-c. Of course, the step down DC converters 42a-c could also be step up DC converters and the second DC voltage could be higher than the first DC voltage.

Figure 5:
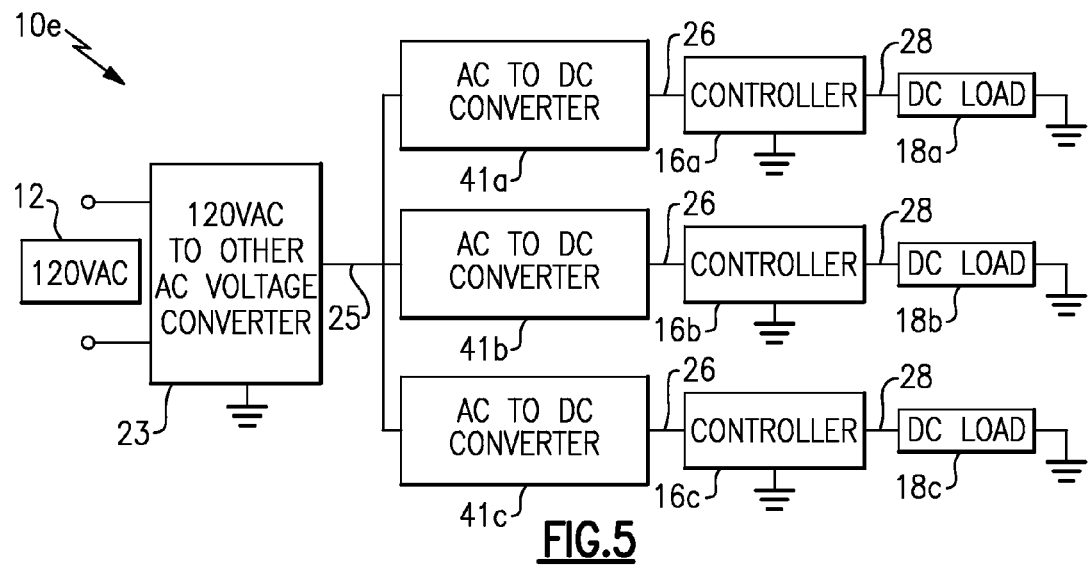
FIG. 5 schematically illustrates a fifth DC distribution system.

FIG. 5 schematically illustrates a fifth DC distribution system 10e that includes a first power converter 23 and a plurality of second power converters 41a-c coupled to the first power converter 23. The first power converter 23 is operable to convert a first AC input voltage from the AC power source 12 into a second AC voltage that is higher or lower than the first AC voltage. The second AC voltage is distributed along power lines 25. The plurality of second power converters 41a-c are operable to convert the second AC voltage to a DC voltage. The DC voltage is distributed along power lines 26 to controllers 16a-c, which are operable to distribute the DC voltage along power lines 28 to loads 18a-c.

Figure 6A:
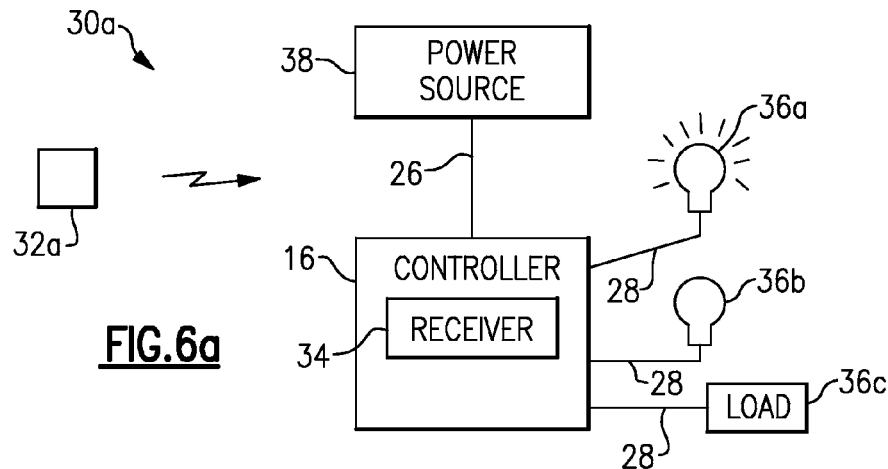
FIG. 6a schematically illustrates a first wireless switching application.

FIG. 6a schematically illustrates a first example wireless switching application 30a. An energy-harvesting switch 32a is operable to transmit wireless signals to a receiver 34, which associated with the controller 16. However, it is understood that the receiver would not need to be included within the controller 16, and could be external to the controller 16. Also, it is understood that the controller 16 could act as a housing for a power converter (e.g. power converter 20, 24, etc.).

The controller 16 selectively couples a load 36a-c to a power source 38 in response to wireless signals sent from the switch 32a to the receiver 34. The load 36a is a lighting load coupled to a first channel of the controller 16, the load 36b is a lighting load coupled to a second channel of the controller 16, and the load 36c is coupled to a third channel of the controller 16. As in the other examples, it is possible that the controller 16 may be coupled to more or less than three items. One energy-harvesting switch is available from Verve Living Systems Product No. X3100, and one controller is available from Verve Living Systems Product No. X2110. However, it is understood that this specific switch and controller would not need to be used. For example, the energy-harvesting switch 32a could correspond to a motion sensor may operable to turn lighting loads 36a-b ON or OFF.

Figure 6B:
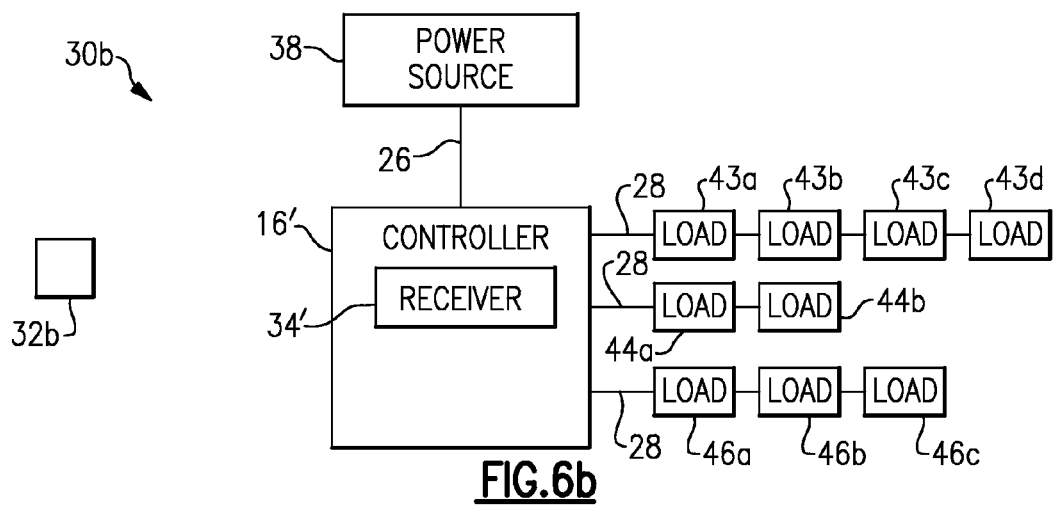
FIG. 6b schematically illustrates a second wireless switching application.
Figure 7:
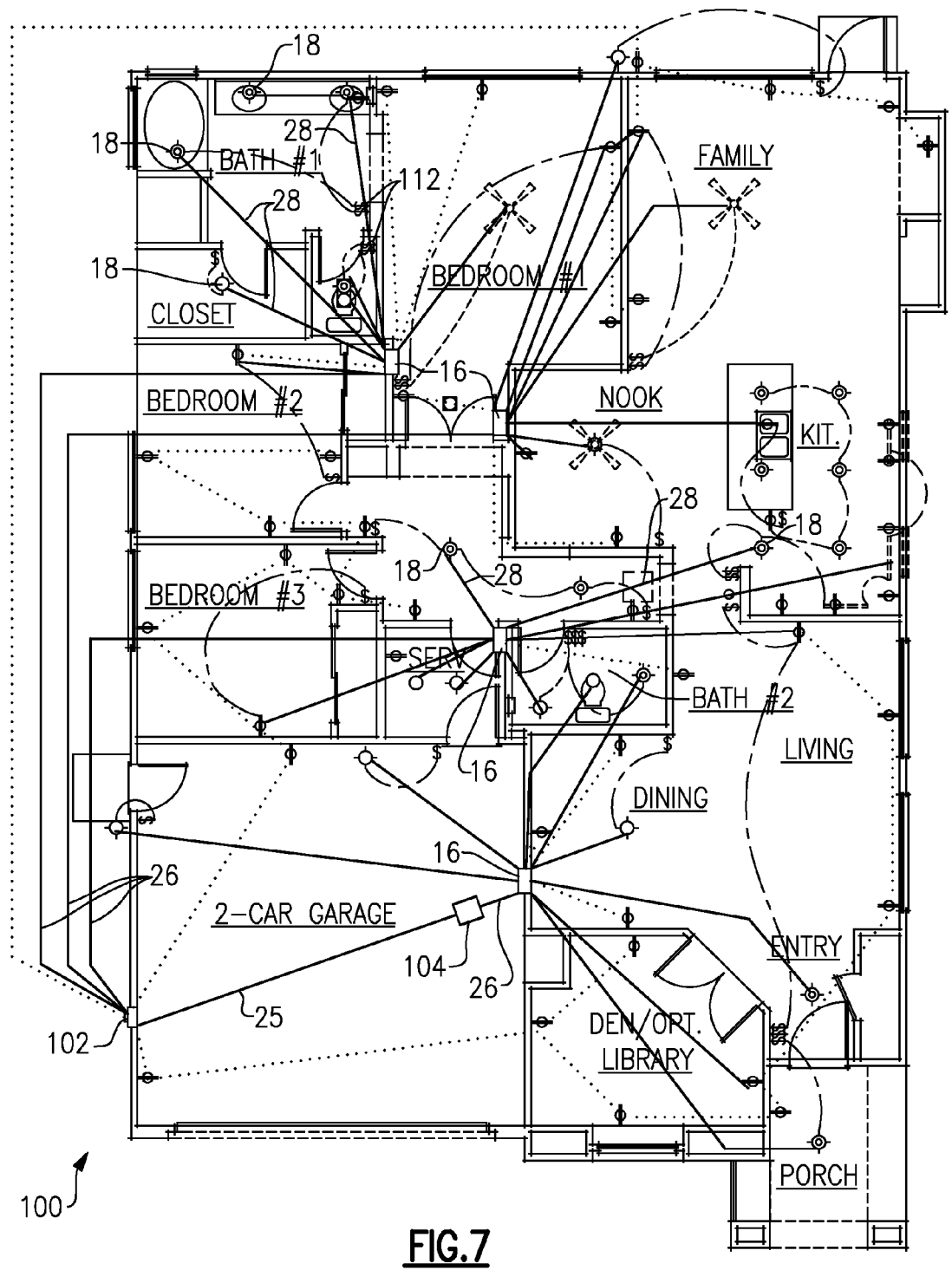
FIG. 7 schematically illustrates the use of the system of FIG. 1 across a building.

FIG. 6b schematically illustrates a second example wireless switching application 30b, in which a plurality of loads 43a-d are connected in parallel to a first channel of controller 16', a plurality of loads 44a-b are connected in parallel to a second channel of controller 16', and a plurality of loads 46a-c are connected in parallel to a third channel of controller 16'. In this example, the loads 43a-d, 44a-b, and 46a-c are addressable so-called "smart loads" capable of two-way communication with the receiver 34'. Such addressable functionality enables multiple loads such as the loads 43a-d to be controlled individually while connected to a single channel of receiver 16'. In one example, the controller 16' communicates with the loads 43, 44, 46 using a DC powerline carrier signal The systems 10a-d of FIGS. 1-4 are applicable to a variety of environments, such as structures (e.g., residential, commercial, and industrial buildings) or outdoor spaces. FIG. 7 schematically illustrates a residential building 100 incorporating a plurality of the controllers 16 as set forth in FIG. 1, coupled to the plurality of DC loads 18. An electrical power source 102 supplies power through a plurality of power lines 26 to a plurality of controllers 16. The electrical power source 102 may correspond to the AC power source 12 and power converter 14 collectively (see FIG. 1), the AC power source 12 on its own (see FIG. 2), the AC power source 12 and the first DC converter 22 collectively (see FIG. 3), the DC power source 40 (see FIG. 4), or the AC power source 12 and power converter 23 (see FIG. 5), for example.

The building 100 also includes a power converter 104, which could correspond to one of the power converters 20 of system 10b (see FIG. 2), one of the power converters 24 of system 10c (see FIG. 3), one of the step down DC converters 42 of system 10d (see FIG. 4), or one of the power converters 41 (see FIG. 5), for example. As shown in FIG. 6, it is possible to place the power converter 104 at a central location in the building 100.

Each of the controllers 16 are shown to have power lines 28 communicating with various DC loads 18, some or all of which may correspond to luminaires including LEDs. If the DC loads 18 include LED lights, use of the systems 10a-e enables an individual to economically provide DC power to the LED lights in the residential building 100 while avoiding use of expensive LED lights having built-in power conversion electronics. Of course, as described earlier, other DC loads could be used. Thus, it can be seen that the electrical power source (optionally in conjunction with power converter 104) distribute a DC voltage throughout a first portion of the building 100 environment, and the controllers 16 distribute a DC voltage throughout a second portion of the building 100 environment.

Receptacles may be coupled to the controllers 16, which could enable an individual to avoid having to use AC adapters to provide DC to electronic items. Also, "smart plug" receptacles operable to convert DC to AC could also be used to so that only DC wiring would be needed in the structure 100.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A direct current power system, comprising:
    a DC power source comprising an AC power source, a first power converter coupled to said AC power source and a second power converter coupled to an output of the first power converter, wherein said DC power source is operable to distribute a DC voltage throughout at least one environment; and
    at least one controller operable to selectively couple a DC load to the DC voltage in response to a wireless signal from an energy-harvesting switch.

2. The system of claim 1, wherein the DC load includes a luminaire having at least one light emitting diode.

3. The system of claim 1, wherein the at least one environment includes a building.

4. The system of claim 1, wherein the DC power source includes at least one of a battery and a generator.

5. The system of claim 1, wherein said first power converter is operable to convert a voltage from the AC power source into a first DC voltage.

6. The system of claim 5, wherein the at least one power converter comprises:
    said first power converter operable to distribute said first DC voltage throughout a first portion of the at least one environment; and
    said second power converter operable to convert the first DC voltage to a second DC voltage, and operable to distribute the second DC voltage throughout a second portion of the at least one environment to the DC load, wherein the second DC voltage is higher or lower than the first DC voltage.

7. The system of claim 1, wherein:
    said AC power source has a first AC voltage;
    said first power converter coupled to the AC power source is operable to convert the first AC voltage to a second AC voltage that is higher or lower than the first AC voltage; and
    said second power converter is operable to convert the second AC voltage into a DC voltage, and operable to distribute the DC voltage throughout an environment to the DC load.

8. The system of claim 1 wherein a DC voltage from the second power converter is distributed throughout a first portion of the at least one environment, and the second DC voltage is distributed throughout a second portion of the at least one environment.

9. A direct current lighting system, comprising:
a DC power source comprising an AC power source, a first power converter coupled to said AC power source and a second power converter coupled to an output of the first power converter, wherein said DC power source is operable to distribute a DC voltage throughout at least one environment; and
at least one controller operable to selectively couple a DC lighting source to the DC voltage in response to a control signal.

10. The system of claim 9, wherein the control signal is a wireless signal from an energy-harvesting switch.

11. The system of claim 9, wherein the at least one environment includes a building.

12. The system of claim 9, wherein said first power converter is operable to convert a voltage from the AC power source into a first DC voltage, and operable to distribute the first DC voltage throughout a first portion of the at least one environment, and wherein said second power converter coupled to an output of the first power converter is operable to convert the first DC voltage to a second DC voltage, and operable to distribute the second DC voltage throughout a second portion of the at least one environment to the DC load, wherein the second DC voltage is higher or lower than the first DC voltage.

13. The system of claim 9, wherein said second power converter is operable to convert the DC voltage from the DC power source into a second DC voltage that is lower than the DC voltage from the DC power source, and wherein the DC voltage from the DC power source is distributed throughout a first portion of the at least one environment, and the second DC voltage is distributed throughout a second portion of the at least one environment.

14. A method for controlling electrical power in an environment comprising:
converting an AC voltage to a first DC voltage using a first power converter coupled to an AC power source;
distributing the DC voltage in an environment;
converting the first DC voltage to a second DC voltage using a second power converter coupled to an output of said first power converter; and
selectively coupling a DC load to the second DC voltage in response to a control signal.

15. The method of claim 14, wherein the control signal is a wireless signal from a self-energizing switch.

16. The method of claim 14, wherein the DC load includes a luminaire having at least one light emitting diode.

* * * * *